No. 869,551. PATENTED OCT. 29, 1907.
J. T. COLE.
WATER COOLER.
APPLICATION FILED JAN. 21, 1907.

3 SHEETS—SHEET 1.

Witnesses:
Inventor:
James T. Cole,
By Dyrenforth, Dyrenforth, Lee and Wiles,
Attys.

No. 869,551. PATENTED OCT. 29, 1907.
J. T. COLE.
WATER COOLER.
APPLICATION FILED JAN. 21, 1907.

3 SHEETS—SHEET 2.

Witnesses:
Inventor:
James T. Cole,
By Dyrenforth, Dyrenforth, Lee & Wills,
Atty's

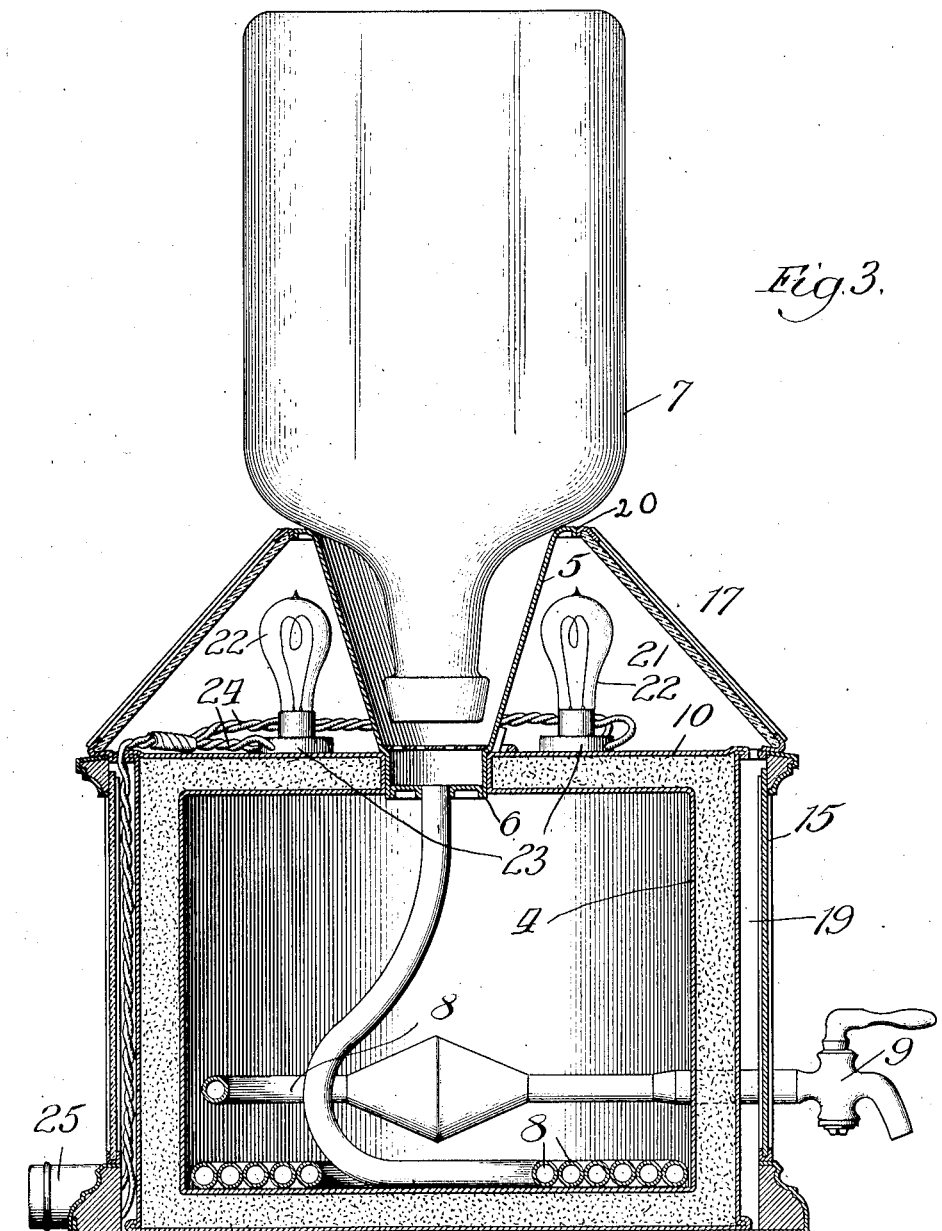

UNITED STATES PATENT OFFICE.

JAMES T. COLE, OF CHICAGO, ILLINOIS.

WATER-COOLER.

No. 869,551. Specification of Letters Patent. Patented Oct. 29, 1907.

Application filed January 21, 1907. Serial No. 353,301.

*To all whom it may concern:*

Be it known that I, JAMES T. COLE, a citizen of the United States, residing at Chicago, in the county of Cook and State of Illinois, have invented a new and useful Improvement in Water-Coolers, of which the following is a specification.

My invention relates to an improvement in the class of coolers for drinking water and beverages, employing an ice-tank equipped with a draw-off faucet and containing a conduit for the liquid communicating with the faucet and which is subjected to the influence of the ice in the tank for cooling the liquid in the conduit.

The cooler to which my improvement relates is of the kind used more commonly in offices and households for dispensing water, and in stores for dispensing such beverages as are obtained at soda-fountains. The tank in such coolers is formed of sheet-metal or of other materials, which are so readily conductive of heat as to cause such extravagant melting of the ice in the tank that undue expense is thereby incurred in running the cooler. Moreover, the surface of the tank, which is attractively ornamental when new, soon becomes so impaired in appearance as to be rendered unsightly by staining under the action of water of condensation which gathers upon it.

The objects of my invention are to provide means for effectively preventing the extravagant consumption of ice and the objectional result of condensation, referred to; and the construction of which, moreover, shall greatly enhance the ornamental appearance of the cooler.

I have devised my improvements with more particular reference to the water-cooler equipment forming the subject of Reissued Letters Patent No. 12352, granted to me May 30th, 1905, and therefore have selected that device in connection with which to illustrate it.

Figure 1:
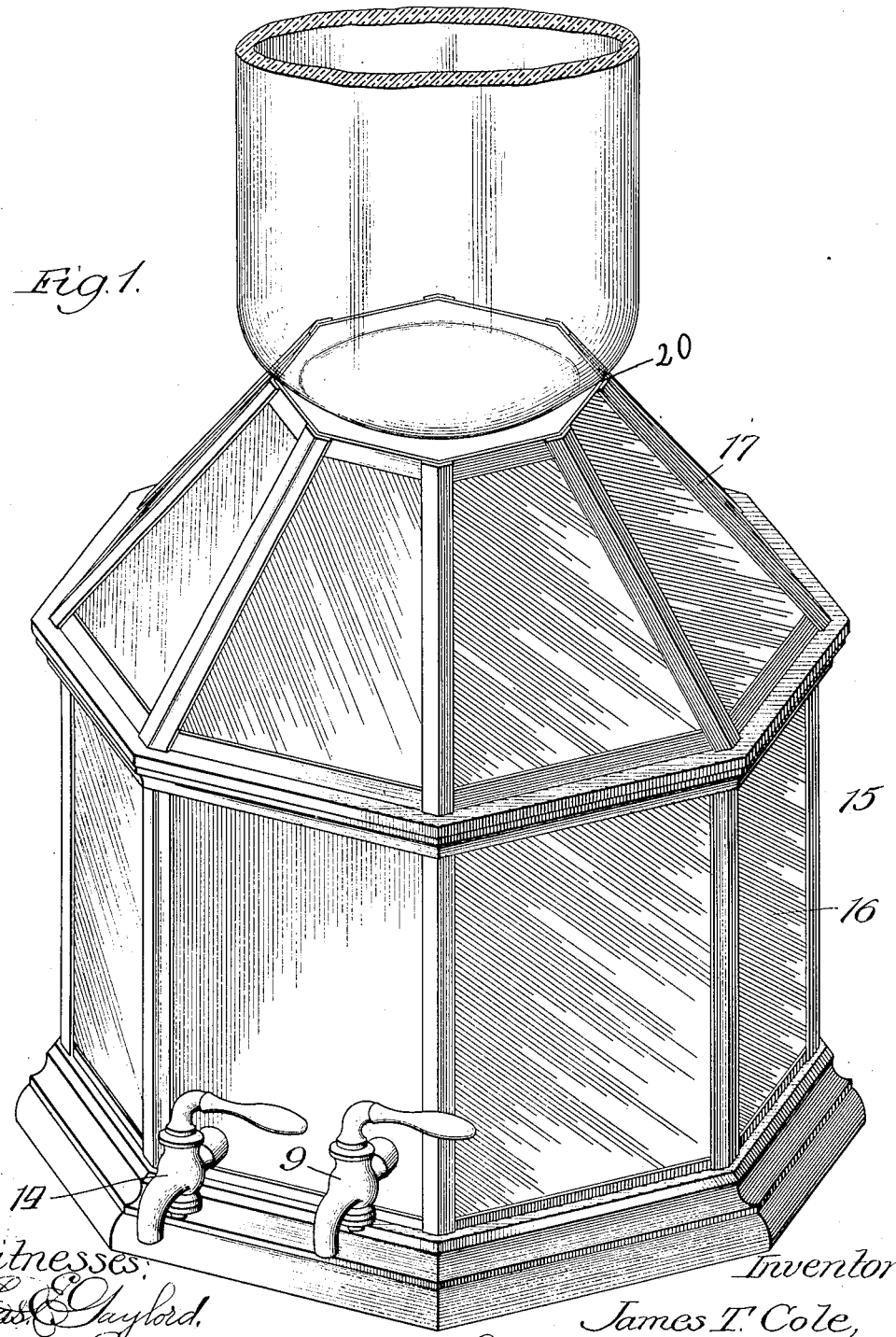
Figure 2:
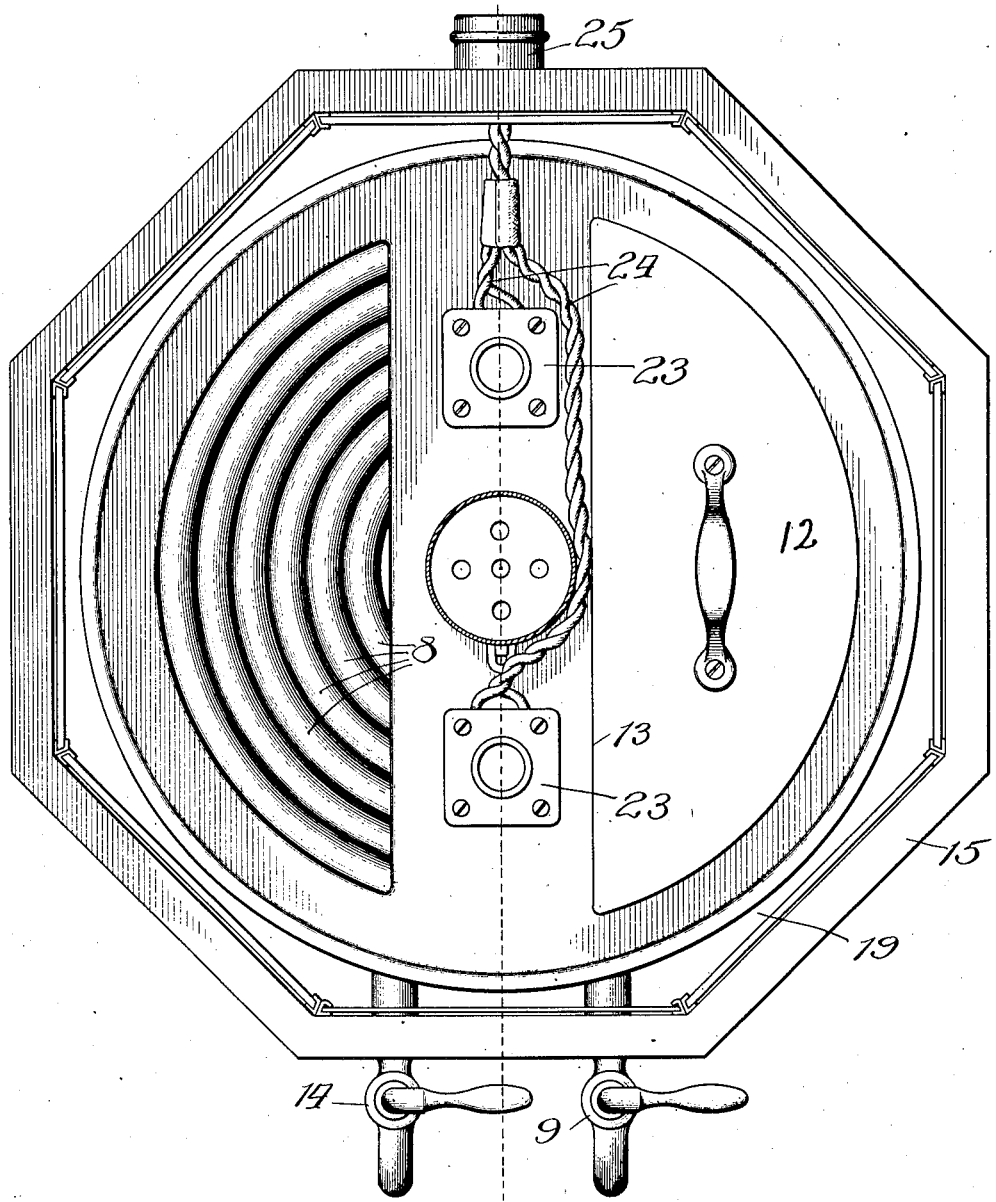

Referring to the accompanying drawings, Figure 1 is a perspective view of my improved water-cooler equipment, showing the bottle, for containing the beverage to be dispensed, in position on its seat, but broken; Fig. 2, a plan view of the cooler with the bottle and crown removed, and Fig. 3, a view in vertical sectional elevation of the cooler-equipment, the section being taken at the line 3 on Fig. 2 and viewed in the direction of the arrow.

The ice-tank 4, seat 5 for a bottle 7 and coil 8 connecting the bottle-seat from its neck 6 with a draw-off faucet 9 are substantially the same as in my aforesaid patent, with the top 10 of the tank, however, provided with two similar removable lids 12 only one of which is shown in Fig. 2 on opposite sides of a central ledge 13, as a preferable construction to facilitate access to the interior of the tank for introducing the ice upon the coil, for cleansing, and the like. A faucet 14 is provided for drawing off from the tank the water resulting from the melting of the ice.

The tank is contained in a casing consisting of a frame 15, forming panel-spaces or openings, and panels of glass 16, preferably of variegated and translucent variety, confined in the openings, and a top 17 of similarly constructed glazed framework in general crown-shape. The paneled frame 15 about the wall of the tank rises from a circumferentially beaded base 18 and forms therewith an interposed dead-air space 19. The crown-top 17 seats removably on the circumferentially beaded upper edge of the frame 15 and has an opening 20 in its upper end at which it closely surrounds the mouth of the seat 5. This crown-top forms a dead-air space 21 over the top of the tank and affords a chamber in which are contained the incandescent electric lamps 22, 22, having their sockets 23 fastened on the ledge 13 and connected by wires 24, through the air-space 19, with a suitable electric coupling 25 on the frame 15, near its base, at which to apply an ordinary plug-connection with a supply of electric current. These lamps afford preferred means for illuminating the cooler-equipment, for enhancing the attractiveness of its appearance. The lamps I employ, by preference, for this purpose are of the well-known "flash-light" variety.

What I claim as new, and desire to secure by Letters Patent, is—

1. In a water cooler, the combination with an ice tank, of a ledge extending across the central portion of the top of the tank, a seat formed in the ledge adapted to receive a liquid holder, a casing consisting of a frame work about the tank, said frame work having panel openings containing panels of translucent material and forming with the tank an interposed air space, a top surmounting the tank top formed of a frame work having panel openings containing panels of translucent material and forming a chamber, and sockets for illuminating means mounted on the ledge whereby said chamber may be illuminated.

2. In a water cooler, the combination with an ice tank, of a ledge extending across the central portion of the top of the tank, a seat formed in the ledge adapted to receive a liquid holder, a casing containing said tank consisting of a glazed frame about the tank and forming therewith an interposed air space and a removable crown-like top of glazed frame work surmounting the tank top and provided with an opening through which the liquid holder passes, said liquid holder being out of contact with the edges of said opening, said top forming an interposed chamber between it and the top of the tank, and sockets for illuminating means mounted on the ledge whereby said chamber may be illuminated.

JAMES T. COLE.

In presence of—
A. U. THORIEN,
C. W. WASHBURNE.